US010175437B2

(12) United States Patent
Smith et al.

(10) Patent No.: US 10,175,437 B2
(45) Date of Patent: *Jan. 8, 2019

(54) SUBSEA CABLE HAVING FLOODABLE OPTICAL FIBER CONDUIT

(71) Applicant: PGS Geophysical AS, Lysaker (NO)

(72) Inventors: Jeremy Crane Smith, Austin, TX (US); Robert A. P. Fernihough, Jarrell, TX (US)

(73) Assignee: PGS Geophysical AS, Oslo (NO)

( * ) Notice: Subject to any disclaimer, the term of this patent is extended or adjusted under 35 U.S.C. 154(b) by 984 days.

This patent is subject to a terminal disclaimer.

(21) Appl. No.: 14/452,211

(22) Filed: Aug. 5, 2014

(65) Prior Publication Data

US 2015/0234143 A1    Aug. 20, 2015

Related U.S. Application Data

(60) Provisional application No. 61/941,389, filed on Feb. 18, 2014.

(51) Int. Cl.
*G02B 6/44* (2006.01)
*G02B 6/50* (2006.01)
(Continued)

(52) U.S. Cl.
CPC .......... *G02B 6/4427* (2013.01); *G01V 1/226* (2013.01); *G01V 3/083* (2013.01); *G02B 6/255* (2013.01);
(Continued)

(58) Field of Classification Search
None
See application file for complete search history.

(56) References Cited

U.S. PATENT DOCUMENTS 4,770,494 A * 9/1988 Csencsits .............. C03C 13/045
385/142
6,269,198 B1 * 7/2001 Hodgson ................ G01H 9/004
356/478
(Continued)

FOREIGN PATENT DOCUMENTS

EP    2204681 A1    7/2010
EP    2520962 A1    11/2012
(Continued)

OTHER PUBLICATIONS

Kojima et al. (Machine Translation of JP 58-002804 A; Jan. 1983).*
(Continued)

*Primary Examiner* — Michelle R Connelly
(74) *Attorney, Agent, or Firm* — Patterson & Sheridan, LLP

(57) ABSTRACT

In at least some embodiments, a disclosed subsea cable includes one or more floodable optical fiber conduits each having at least one tight buffered optical fiber for transporting optical signals. Each tight buffered optical fiber may have a relatively limited length. The subsea cable may further include multiple strength members contra-helically wound around or together with the one or more floodable optical fiber conduits. There may also or alternatively be included at least one hermetically sealed optical fiber conduit having at least one protected optical fiber spliced to one of the tight buffered optical fibers. At least some implementations splice each of the tight buffered optical fibers to corresponding protected fibers for the long-haul communications. Flooding of the floodable conduits may be provided via connectors at the subsea cable ends, via breakout locations where sensors are attached, and/or via vents in the conduit wall. Some method embodiments deploy the disclosed subsea cable designs in a body of water, putting the interior of at least one floodable optical fiber conduit in fluid (Continued)

communication with the body of water while supporting extended use for communicating signals, particularly in deep water where temperatures are relatively low. Because the floodable conduits have pressure-equalized interiors they may be formed from plastic or other materials that ease the process of attaching sensors to the subsea cables.

19 Claims, 2 Drawing Sheets

(51) Int. Cl.
  G02B 6/255    (2006.01)
  G01V 1/22     (2006.01)
  G01V 3/08     (2006.01)
  G01V 1/28     (2006.01)
(52) U.S. Cl.
  CPC ......... *G02B 6/443* (2013.01); *G02B 6/4434* (2013.01); *G02B 6/4494* (2013.01); *G02B 6/506* (2013.01); *G01V 1/28* (2013.01); *G01V 2003/086* (2013.01)

(56) References Cited

U.S. PATENT DOCUMENTS

| | | | |
|---|---|---|---|
| 6,289,158 B1* | 9/2001 | Blyler ................. | C03C 25/1065 385/114 |
| 6,314,056 B1 | 11/2001 | Bunn et al. | |
| 6,606,186 B2 | 8/2003 | Maas | |
| 7,222,534 B2 | 5/2007 | Maas et al. | |
| 8,388,235 B1* | 3/2013 | Volker ................. | G02B 6/3816 385/52 |
| 8,645,071 B2 | 2/2014 | Fernihough | |
| 9,557,512 B2* | 1/2017 | Toth ..................... | G02B 6/4428 |
| 9,746,633 B2* | 8/2017 | Segsworth ............... | G01V 1/18 |
| 9,823,416 B2* | 11/2017 | Segsworth ........... | G02B 6/2558 |
| 9,823,433 B2* | 11/2017 | Segsworth ............. | G02B 6/506 |
| 2003/0011878 A1 | 1/2003 | Maas et al. | |
| 2003/0228783 A1* | 12/2003 | Cairns ................. | G02B 6/4428 439/204 |
| 2007/0258319 A1* | 11/2007 | Ronnekleiv ........ | G01D 5/35383 367/20 |
| 2011/0096624 A1* | 4/2011 | Varadarajan ............. | G01V 1/16 367/20 |
| 2012/0205137 A1* | 8/2012 | Fjellner ................ | F16L 53/007 174/116 |
| 2012/0250457 A1 | 10/2012 | Rickert et al. | |
| 2014/0063493 A1* | 3/2014 | Nash .................. | G01D 5/35383 356/226 |
| 2014/0112094 A1 | 4/2014 | Fernihough | |
| 2014/0160885 A1 | 6/2014 | Tenghamn | |
| 2015/0362118 A1* | 12/2015 | Emerson ............... | G02B 6/4496 285/45 |
| 2016/0097872 A1* | 4/2016 | Fernihough ............. | G01P 15/18 367/15 |
| 2017/0038545 A1* | 2/2017 | Segsworth ........... | G02B 6/4413 |

FOREIGN PATENT DOCUMENTS

| | | | | |
|---|---|---|---|---|
| EP | 2594966 A2 | 5/2013 | | |
| EP | 2594966 A3 | 10/2014 | | |
| GB | 2051398 A | 1/1981 | | |
| JP | 58002804 A | * 1/1983 | ........... | G02B 6/4427 |
| JP | 08234067 A | * 9/1996 | ........... | G02B 6/4427 |

OTHER PUBLICATIONS

Amano et al., Machine Translation of JP 08-234067A, Sep. 1996.*
Amano et al. (Translation of JP 08-234067 A, Sep. 1996, 15 pages).*
Arkema Innovative Chemistry, "Paints and coatings / Delivering Innovative Products and Services to Coatings Formulators Worldwide," Arkema Innovative Chemistry, www.arkema.com, 12 pgs, [retrieved on Jul. 18, 2014 from the Internet <URL: http://www.arkema.com/export/shared/.content/media/downloads/products-documentations/coatings/arkema-global-coatings-offer-2014.pdf>].
Dupont—Hytrel HTR8351 NC021 (Preliminary Data), "Thermoplastic Polyester Elastomer", DuPont, www.dupont.com, Revised Oct. 8, 2013, 2 pgs., [retrieved on Jul. 18, 2014 from the Internet <URL: http://dupont.materialdatacenter.com/profiler/material/pdf/datasheet/HytrelHTR8351NC021>].
Crompton Corp., "Polymer Modifiers—Polybond 3200 Chemically Modified Polyolefin," Crompton—Olefins & Styrenics, www.cromptoncorp.com, Revised Oct. 5, 2004, 2 pgs.
Crompton Corp., "Polymer Modifiers—Polybond 3000 Chemically Modified Polyolefin," Crompton—Olefins & Styrenics, www.cromptoncorp.com, Revised Oct. 5, 2004.
European extended Search report dated Juiy 13, 2015, in the prosecution of patent application No. 15155025.8, 8 pages.
James L. Baucom et al,: "Ice in Stranded Loose Tube and Single-Tube Fiber Optic Cables", Corning Cable Systems, International Wire & Cable Symposium, Proceedings of the 52nd IWCS/Focus, 2003, pp. 472-475.
Mexican Office Action for Application No. MX/A/2015/002126 dated Feb. 1, 2017.

* cited by examiner

SUBSEA CABLE HAVING FLOODABLE OPTICAL FIBER CONDUIT

CROSS-REFERENCE TO RELATED APPLICATION

This application claims priority to Provisional U.S. Application Ser. No. 61/941,389, titled "Pressure-Balanced Subsea Optical Cable" and filed Feb. 18, 2014 by Jeremy Crane Smith and Robert Alexis Peregrin Fernighough, which is incorporated herein by reference.

BACKGROUND

Optical fibers are commonly employed for communicating data at high bandwidths. They have been viewed by the telecommunications industry as a crucial ingredient for evolving the communications infrastructure to its current state, and for that reason the investments to develop fiber optic communications technology have focused on making such bandwidths available over long distances. The long distances further necessitate producing cables that are simultaneously affordable and robust. Telecommunications cables typically must resist not only the minor traumas associated with transport and installation, but also the insidious effects of aging and long term exposure to the elements.

As one example, consider the well-known hydrogen darkening effect. Over a long exposure time, hydrogen, whether arising from corrosion, biological processes or other water-associated causes, migrates into the fiber core and reacts chemically with dopants or other impurities to "tint" the glass. Over short runs, the effect of this tint may be barely perceptible, but over long distances the signal is overwhelmed by the resulting attenuation. Two other water-related degradation mechanisms are stress corrosion and zero-stress aging, both of which, over time, reduce the strength and transparency of unprotected optical fibers.

To combat these effects and improve communications cable robustness, the industry has, through a great deal of investment and effort, developed a standard design approach. To protect optical fibers from hydrogen darkening and water-related degradation mechanisms, communications cables route optical fibers through hermetically sealed stainless steel tubing. In the event of a pinhole or other flaw in the stainless steel tubing that might permit water to breach the barrier, gel or another filler material in the tubing serve to prevent fluid migration along the length of the tubing. Often, the stainless steel tubing is itself coated to provide a redundant seal against water penetration, particularly in high pressure or marine applications.

Rather than reinventing the wheel, the geophysical surveying industry has leveraged the technology developed by the telecommunications industry for buried cables and subsea cables. Designs in development for optical-communication-based survey streamers and seafloor cables typically employ commercially available subsea telecommunications cables and technology as the backbone of system designs. Despite the manufacturing difficulties and costs caused by the standard design approach, these inherited precautions against exposing the optical fibers to water represent the industry's accepted wisdom: common sense shared by technicians, engineers, and experts alike.

SUMMARY

In contravention of the accepted wisdom, it has been found that subsea cables can successfully employ floodable optical fiber conduits for many extended-exposure applications including permanent reservoir monitoring (PRM). This alternative cable design approach may be expected to yield substantial savings in manufacturing costs. In at least some embodiments, a disclosed subsea cable includes one or more floodable optical fiber conduits each having at least one tight buffered optical fiber for transporting optical signals while in extended contact with water. Each tight buffered optical fiber may have a length between 5 and 200 meters, or in other embodiments, a length between 200 meters and 2 km. The cable may further include multiple strength members contrahelically wound around or together with the one or more floodable optical fiber conduits. There may also or alternatively be included at least one hermetically sealed optical fiber conduit having at least one protected optical fiber that, in a completed cable, gets coupled to one of the tight buffered optical fibers. At least some implementations splice or otherwise connect each of the tight buffered optical fibers to corresponding protected fibers for the long-haul communications. Flooding of the floodable conduits may be provided via connectors at the cable ends, via breakout locations where sensors are attached, and/or via vents in the conduit wall.

Some method embodiments deploy the disclosed cable designs in a body of water, putting the interior of at least one floodable optical fiber conduit in fluid communication with the body of water. Due to limitations on the length of the exposed fiber or other precautions provided herein, the cable can support extended use for communicating signals via the fibers in the flooded conduits, particularly in deep water where temperatures are relatively low. To limit the length of exposed fibers while at the same time providing for longer-distance communication capability, the exposed fibers may be spliced to protected fibers in hermetically sealed conduits. Because the floodable conduits have pressure-equalized interiors they may be formed from plastic or other materials that ease the process of attaching sensors to the cables and that reduce the overall cost of raw cable.

Figure 1:
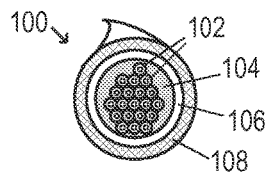
FIG. 1 shows an illustrative hermetically sealed optical fiber conduit.

It should be understood, however, that the specific embodiments provided in the figures and detailed description below do not limit the disclosure. On the contrary, they provide the foundation for one of ordinary skill to discern the alternative forms, equivalents, and other modifications that are encompassed in the scope of the appended claims.

TERMINOLOGY

The terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

DETAILED DESCRIPTION

Fiber optic cables may be deployed in a number of underwater environments, including subsea applications such as permanent reservoir monitoring (PRM), where there is water exposure for relatively long periods of time (e.g., months or years). In particular, PRM systems may be designed for decades of operation in ultra-deep water (e.g., greater than 1500 m), while also remaining suitable for use at shallower depths. Conventional wisdom for such applications dictates the use of gel-filled stainless steel conduits for the optical fibers with robust hermetic seals at every connection and each of the sensor splices, which typically number in the hundreds and possibly the thousands. Each seal represents a cost, a time investment, and a potential failure point for the system. Where the need for such seals (and associated costs and risks) can be eliminated, manufacturing lead times can be reduced and manufacturing efficiencies improved.

In this vein, it is noted that for short lengths of optical fiber (e.g., on the scale of meters rather than kilometers), water exposure has typically not been the root cause of failure. It is believed that the hydrogen darkening and water-related degradation mechanisms need not be a large concern (particularly when considered in a PRM environment) as long as the length of exposed fiber is kept relatively short. For example, the exposed optical fiber length may in some instances be 1 meter, 2 meters, 3 meters, 4 meters, 5 meters, 10 meters, 20 meters, 50 meters, 100 meters, 200 meters, 300 meters, 400 meters, 500 meters, or any suitable range up to a maximum of about 2 kilometers or so (depending on the precise application).

Over such lengths, it is believed that hydrogen darkening would have a relatively negligible effect, even if it were to occur. But at the low temperatures typically encountered in most subsea applications (particularly those below 500 meters depth), hydrogen diffusion occurs so slowly that no discernable darkening would be expected to occur over the lifetime of a typical PRM application. Moreover, it appears that in the anticipated operating environments for PRM, the low levels of available hydrogen make such darkening even less of a concern.

In addition to limiting the lengths of the exposed fiber, certain disclosed embodiments provide that the exposed fiber be adequately coated ("tight buffered") with an appropriately chosen conformal polymer that mitigates the effects of water molecule diffusion. In unprotected optical fibers, water molecules may expand pre-existing surface flaws, causing crack propagation in a fashion similar to water freezing and expanding a crack within a cement surface. If this coating (buffer) resists delamination or otherwise remains adhered to the optical fiber, it may prevent the water molecule diffusion process from leading to failures. In some instances, it may achieve this in the following way: as water diffuses through the polymeric buffer, a silicate layer may form on the surface of the glass, but will typically not migrate, instead remaining conformal with the buffer and blocking further diffusion of other water molecules. Thus the buffer essentially halts the mechanical degradation caused by crack growth.

Previous PRM cable designs attached sensors (e.g., accelerometers, hydrophones, etc.) to the PRM cable at regular distances (e.g., every 50 meters in some instances). The optical fibers in the outer cable layer were accessed (broken out of the cable) at these locations for attachment to the sensors. These access points were then pressure-sealed to prevent the ingress of water. In contrast, the PRM cable designs disclosed herein may be specifically configured to use the locations of each of the attached sensors in the sensor array as points of entry for the water to flood the optical fiber conduits between sensor locations. These conduits may in some embodiments be either an engineered polymeric material or corrosion-resistant steel. They may also be considered "dry," in the sense that they need not be filled with gel as has typically been done in subsea cables. With this approach, the conduits may become pressure-balanced (no differential pressure across the tube wall) in the subsea environment. This allows for a much wider selection of lower cost materials and processing methods, as well as removing the necessity for high-pressure seals throughout the system.

To enable exposed optical fiber lengths to be limited in long cables, some disclosed cable embodiments also incorporate the traditional hermetically sealed, gel-filled tubes within an inner layer in the cable. At the end of each cable section (feasible cable section lengths may be in the range of 500 m to 5 km), these hermetically sealed conduits may be accessed to connect selected optical fibers to exposed optical fibers in the outer cable layer and to connect the rest of the inner conduit fibers to the hermetically sealed conduits in adjacent sections. Space to connect the sections and protect the splices is provided by pressure sealed modules (referred to as "splice cans") which are typically maintained at 1 atmosphere while deployed subsea. Thus at least some cable embodiments have strings of hermetically sealed optical fiber conduits that may extend the full length of the cable. Therefore, these inner fibers need not be exposed to the outside environment. Within the pressure sealed modules, the outer flooded fibers may be spliced (or otherwise connected) to the inner sealed fibers in subsequent sections, thus limiting the exposed fiber to a manageable length. In addition to splicing, suitable connection methods include coupling via passive splitters, amplifiers, and active multiplexers of any kind Active multiplexers may include amplifiers, filters, switches, frequency shifters, demodulators, buffers, protocol converters, and modulators.

Turning now to the figures, FIG. 1 shows an illustrative hermetically sealed optical fiber conduit 100. The illustrative hermetically sealed optical fiber conduit 100 carries twenty optical fibers 102 within a gel-filled interior 104 of a stainless steel through tube 106 having an external waterproof layer 108. In other words, the optical fibers 102 are protected optical fibers. (Different embodiment may have greater or lesser numbers of optical fibers 102.) In at least some embodiments, the optical fibers 102 are each single-mode, low water peak, 250 micron diameter, dual acrylate optical fibers compliant with International Telecommunications Union (ITU) standard ITU-T G.652.D. In at least some embodiments, the water-blocking gel fills at least 85% of the remaining volume of the tubing interior 104. The gel may include carbon or other dopants to capture available hydrogen before it diffuses into the fiber. In at least some embodiments, the through tube 106 consists of 316L stainless steel with an outer diameter of about 2 mm and a wall thickness on the order of 50 microns. The waterproof layer 108 provides a redundant seal against imperfections in the tube 106, and may be a sheath of a high density polyethylene (HDPE) with a PolyBond™ additive (or other compatibilizing agent that lowers the interfacial surface energy to promote bonding with the metal tube) and an optional colorant, giving the hermetically sealed optical fiber conduit 100 a total outer diameter of approximately 3.0 mm. The optical fibers 102 may be provided with a minimum of 0.3% excess length relative to the length of the tube 106 to accommodate differing strains of the various conduit materials.

Figure 2:
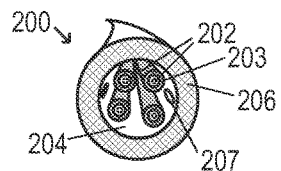
FIG. 2 shows an illustrative floodable optical fiber conduit.

FIG. 2 shows an illustrative floodable optical fiber conduit 200. The illustrative conduit floodable optical fiber 200 carries four optical fibers 202 within a "dry" (i.e., not gel-filled) interior 204 of a loose plastic tube 206 potentially having periodic vents 207 to provide fluid communication across the tubing wall. (The vents 207 are optional, as flooding or fluid communication between the exterior and the interior 204 may alternatively or additionally be enabled from the ends of the floodable optical fiber conduit 200 and anywhere breaks are made to access the optical fibers 202.) The optical fibers 202 are each provided with a tight buffer layer 203. That is, the buffer layers 203 conform with the outer surface of the optical fibers 202 and adhere in a fashion that resists separation from the outer surface in the presence of water. In other words, the optical fibers 202 are tight buffered optical fibers.

In at least some embodiments, the optical fibers 202 are each single-mode, low water peak optical fibers compliant with International Telecommunications Union (ITU) standard ITU-T G.657.A1, having an acrylate outer diameter of 250 microns and a buffer layer outer diameter of 500 to 900 microns. The tight buffer layer 203 may be polymeric, using a thermoplastic elastomer such as Hytrel® from DuPont or a thermoplastic fluoropolymer such as Kynar® polyvinylidene fluoride (PVDF) from Arkema, both of which offer tight conformal coatings that resist delamination. Though both materials are extremely stable in water, the latter offers a particularly low hydrogen permeability. Colorants may be added to the buffer material to make the optical fibers readily distinguishable.

In at least some embodiments, the loose plastic tube 206 consists of polypropylene or PVDF with an outer diameter of 3.0 mm and an inner diameter of 2.0 mm. Colorants may be included to make multiple such floodable optical fiber conduits 200 readily distinguishable. The optical fibers 202 may be provided with a minimum of 0.3% excess length relative to the length of the loose plastic tube to accommodate differing strains of the various conduit materials.

Figure 3:
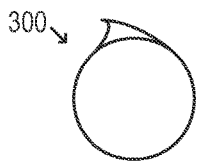
FIG. 3 shows an illustrative galvanized steel wire.

FIG. 3 shows an illustrative galvanized steel wire 300. In at least some embodiments, the galvanized steel wire 300 consists of high-strength steel with an outer diameter of about 3.2 mm. The galvanized steel wire 300 is galvanized for corrosion resistance or may alternatively be provided with a Galfan coating. It is noted that the galvanized steel wire functions mainly as a long-lived flexible strength member and for some applications may be replaced with other wire or strand materials that provide adequate design strengths. Such materials may include other metals, polymers, and natural fibers.

Figure 4:
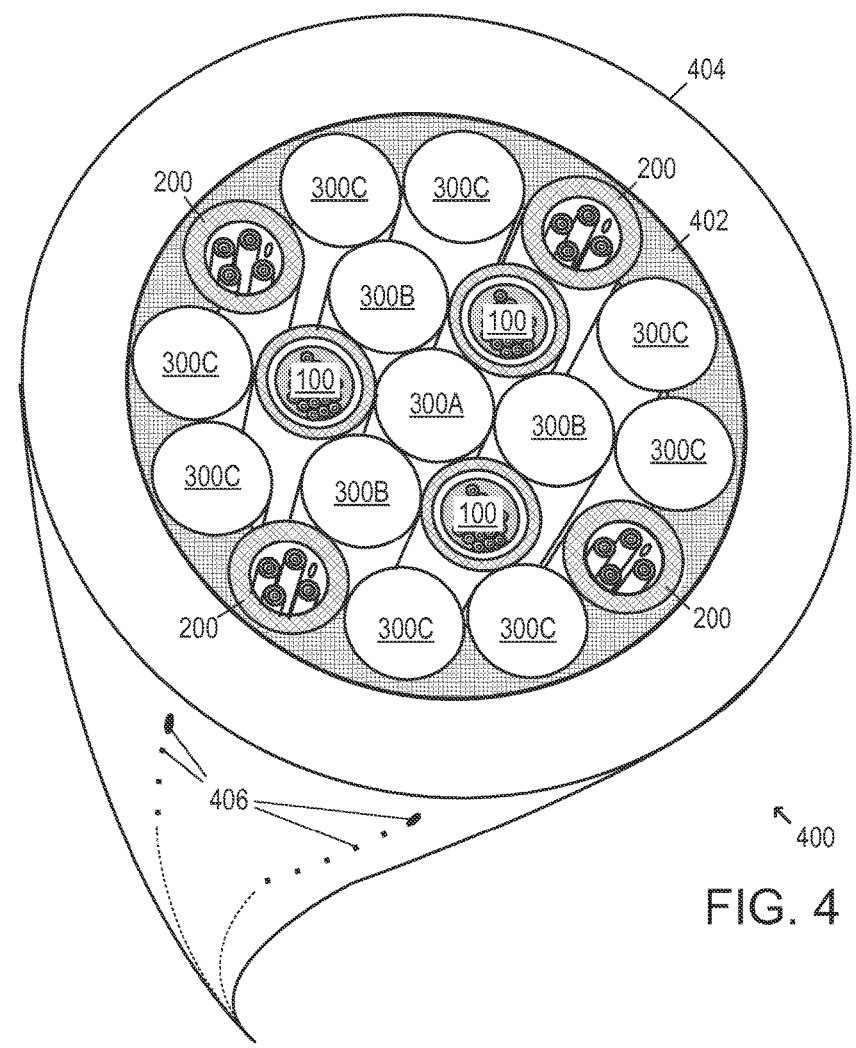
FIG. 4 shows an illustrative subsea cable having floodable optical fiber conduits.

FIG. 4 shows an illustrative subsea cable 400 having one or more floodable optical fiber conduits. The illustrative subsea cable 400 has three strand layers, with a center layer consisting of a galvanized steel wire 300A. Wound helically around the center layer is a second layer of six strands. The second layer has three galvanized steel wires 300B interspersed with three hermetically sealed optical fiber conduits 100. Helically contra-wound around the second layer is an outer layer of twelve strands. (The relative winding pitches may be chosen to provide torque balancing between the layers.) Two out of every three outer strands are galvanized steel wires 300C, and the third of every three outer strands is a floodable optical fiber conduit 200. Alternative embodiments include other combinations and configurations of hermetically sealed optical fiber conduits 100, floodable optical fiber conduits 200, and galvanized steel wire 300 within subsea cable 400. Enclosing the strands is an outer cable jacket 404, potentially having periodic vents 406 to provide fluid communication between the exterior and interior of the cable. (The vents 406 are optional, as flooding or fluid communication between the exterior and the interior may alternatively or additionally be enabled from the ends of the subsea cable 400 and anywhere breaks are made to access the floodable optical fiber conduits 200. Vents 406 may be of any size or shape capable of providing flooding or fluid communication between the exterior and the interior of outer cable jacket 404.) A polymeric bedding layer 402 may enclose the outer strand layer, extending into the interstices between the outer layer strands to provide additional cable crush resistance and minimize the flex-induced bearing forces exerted by the galvanized steel wires on the floodable conduits. If vents 406 are provided in the outer cable jacket 404, the vents 406 may also penetrate the polymeric bedding layer 402. In at least some embodiments, outer cable jacket 404 consists of a high density polyethylene (HDPE) material.

Figure 5:
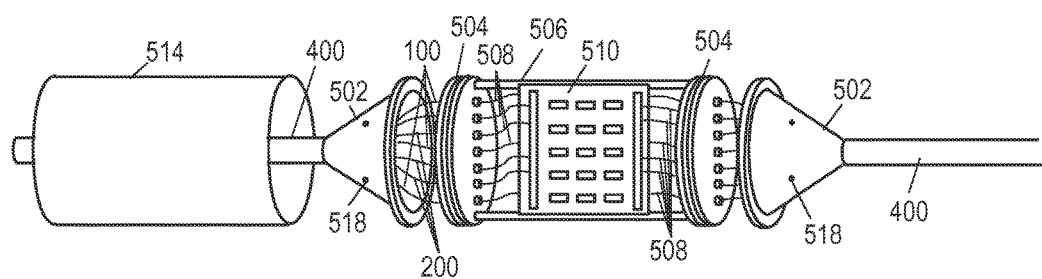
FIG. 5 shows an illustrative "splice can" connector.

FIG. 5 shows a partially-exploded view of an illustrative connector of the "splice can" variety for coupling together different segments of subsea cable 400. A connector cone 502 is placed over the end of each segment and secured to the subsea cable 400, preferably by mechanical attachment to the galvanized steel wires 300. The connector cones 502 provide room to spread and route the optical fibers from the hermetically sealed conduits 100 and the floodable conduits 200. The optical fibers may be routed via feedthroughs in pressure plates 504, which feedthroughs are then sealed before being mounted to the connector cones 502. On the pressure-controlled side of the pressure plates 504, the optical fibers are labeled 508. Frame rails 506 attach the pressure plates 504 together and support a connection module assembly 510 that interconnects the appropriate optical fibers 508. As previously mentioned, such interconnections may be performed using splicing, passive couplers, amplifiers, and/or active multiplexers.

A housing 514 attaches to the pressure plates 504, forming a hermetically sealed canister that shields the optical fibers 508 and connection module assembly 510 from exposure to pressure or water. The connector cones 502 are not sealed, and consequently they permit flooding of interiors. Vents 518 may be provided to facilitate such flooding. The floodable conduits 200 are connected to the space inside the connector cones 502 so that the interiors are fluidly coupled to the exterior of the subsea cable 400 via these spaces.

Figure 6:
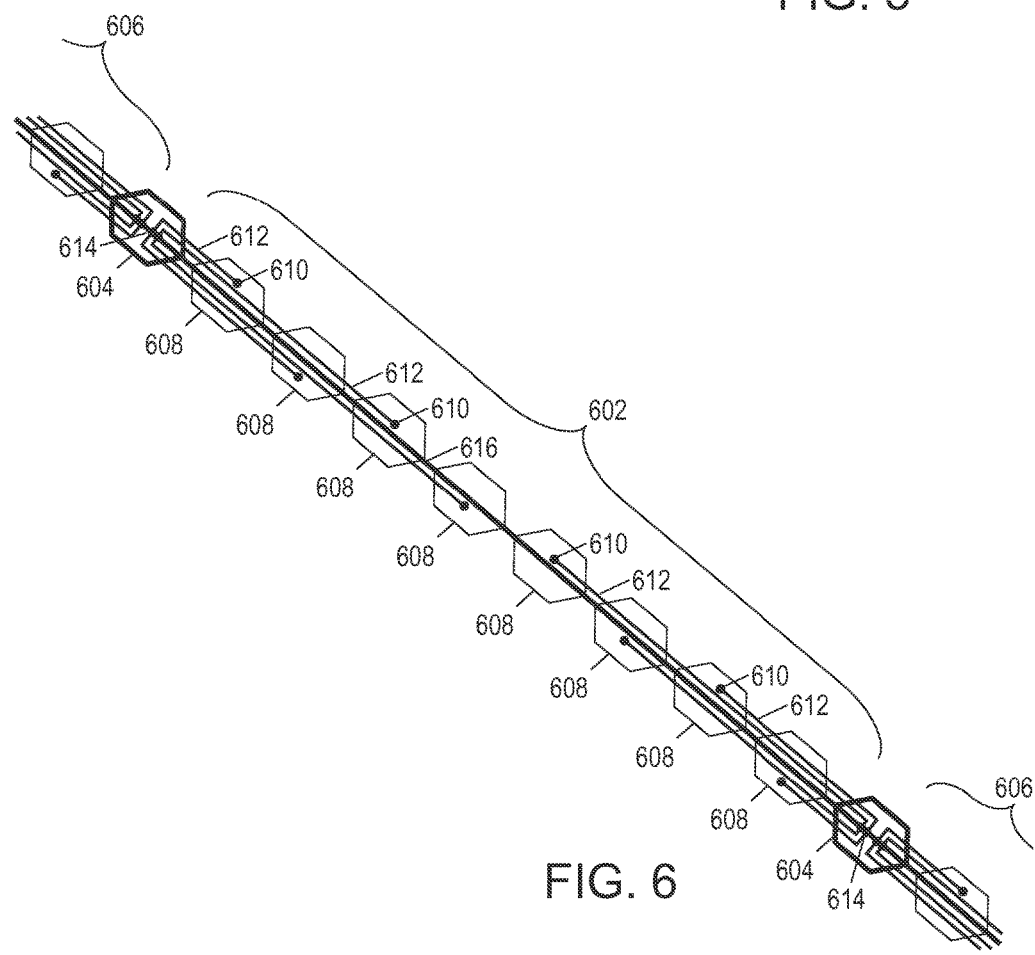
FIG. 6 shows a simplified communication architecture schematic.

FIG. 6 shows a simplified communication architecture schematic, to illustrate how the interconnection of optical fibers from the hermetically sealed conduits and the floodable conduits might be performed. FIG. 6 shows a segment 602 of subsea cable 400 coupled by connectors 604 to its neighboring segments 606. Spaced along the length of segment 602 (and neighboring segments 606) are geophysical survey energy sensors 608. Each of these sensors 608 is coupled (as represented by dots 610) to an associated fiber 612 in a floodable conduit. At the connectors 604, each of the floodable conduit fibers 612 is coupled (as represented by dots 614) to a fiber in a hermetically sealed conduit 616. The connectors 604 further provide coupling between corresponding fibers in the hermetically sealed conduit of segment 602 and its neighboring segments 606.

The segmented subsea cables may be assembled with sensors of geophysical energy (e.g., seismic, electromagnetic) and deployed in a body of water as spatially-distributed on-bottom cables. The deployed cables have at least one floodable optical fiber conduit with an interior in fluid communication with the body of water. The cables are coupled at one end to an interface that supplies optical interrogation signals to the optical fibers in the backbone, i.e., in the hermetically sealed conduits. The connection module assemblies cooperatively distribute the interrogation signals to the sensors and return the modulated measurement signals from the sensors to the interface, where they may be captured in digital form by a measurement data acquisition system and stored for later processing.

Between the connection module assemblies and the sensors, the optical signals are each communicated via at least one tight buffered optical fiber along the floodable optical fiber conduit, and between the interface and the connection module assemblies, the optical signals are each transported over at least one protected optical fiber in a hermetically sealed optical fiber conduit. The tight buffered optical fiber has a length of no more than 2 km, though lengths as short as 5 m are also contemplated, and may have a thermoplastic elastomer or a thermoplastic fluoropolymer as a conformal buffer layer material.

The on-bottom cables may be deployed in water bodies having depths in excess of 500 m, and are expected to by employed periodically over a period of at least ten years for, e.g., PRM operations. PRM operations may involve seismic shots to generate seismic waves or controlled source electromagnetic (CSEM) transmissions to generate electromagnetic fields, or such operations may be entirely passive, monitoring sensor responses to background sources of such waves and fields. The sensor signals are processed to map subsurface distributions of fluid and rock properties and to track changes to such distributions over time, e.g., as hydrocarbons are produced from subsurface reservoirs.

The processing may further produce geophysical data in intermediate processing stages such as re-sampled and stacked traces, migrated and filtered data volumes, and imaged subvolumes. Each of these, including the raw acquired data and the final maps of subsurface property distributions, can be packaged as a geophysical data product and recorded on a tangible, nonvolatile computer readable storage medium suitable for importing the geophysical data product onshore. Such geophysical data products can be further subjected to geophysical analysis and interpretation, e.g., to develop and optimize reservoir production strategies.

In accordance with an embodiment of the invention, a geophysical data product may be produced. The geophysical data product may include seismic data communicated as signals via a tight buffered optical fiber along a floodable optical fiber conduit which may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis, including further data processing, may be performed on the geophysical data product.

Though the foregoing description presents specific cable embodiments which may be used to satisfy various challenges presented by the extreme environments presented by PRM installation and design life, such embodiments may also provide a solution that is applicable across multiple other scenarios and applications. Moreover, there are other underwater and underground cable embodiments within the scope of this disclosure having greater or fewer numbers of floodable optical fiber conduits with greater or lesser numbers of tight buffered optical fibers. Where long length cables are desired, such cables may further include hermetically sealed conduits with protected optical fibers that couple to optical fibers of the floodable conduits in a manner that limits the lengths of the exposed fibers. As required by other design constraints, additional strength members may be included along with protective jackets. The rated lifetimes for the disclosed cables may be expected to exceed 10 years, 20 years, 25 years, or more.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A subsea cable that comprises:
   one or more floodable optical fiber conduits each having at least one tight buffered optical fiber for transporting optical signals, wherein each tight buffered optical fiber comprises:
   a plastic-coated optical fiber; and
   a thermoplastic elastomer or a thermoplastic fluoropolymer as a conformal coating on the plastic-coated optical fiber.

2. The subsea cable of claim 1, wherein each tight buffered optical fiber has a length between 5 m and 2 km.

3. The subsea cable of claim 1, further comprising multiple strength members helically wound around or together with the one or more floodable optical fiber conduits.

4. The subsea cable of claim 1, further comprising at least one hermetically sealed optical fiber conduit having at least one protected optical fiber spliced to a tight buffered optical fiber from the one or more floodable optical fiber conduits.

5. The subsea cable of claim 4, wherein each of multiple tight buffered optical fibers from the one or more floodable optical fiber conduits is spliced to a corresponding protected optical fiber in the at least one hermetically sealed optical fiber conduit.

6. The subsea cable of claim 5, further comprising:
   two cable segments; and
   a connector to join an end of one cable segment to an end of the other cable segment, wherein splices between the tight buffered optical fibers and the protected optical fibers are made within the connector.

7. The subsea cable of claim 6, wherein interiors of the one or more floodable optical fiber conduits are in fluid communication with an exterior of the subsea cable via the connector.

8. The subsea cable of claim 1, wherein interiors of the one or more floodable optical fiber conduits are in fluid communication with an exterior of the subsea cable via one or more vents in a wall of the floodable optical fiber conduit.

9. The subsea cable of claim 1, further comprising an array of sensors attached along a length of the subsea cable, each sensor in the array coupled to at least one tight buffered optical fiber from a floodable optical fiber conduit and providing fluid communication between an interior of the floodable optical fiber conduit and an exterior of the subsea cable.

10. The subsea cable of claim 1, wherein the conformal coating is configured to at least one of:
mitigate effects of water molecule diffusion,
resist separation from an outer surface of the plastic-coated optical fiber,
resist delamination,
be extremely stable in water, and
have a low hydrogen permeability.

11. The subsea cable of claim 1, wherein the plastic-coated optical fiber is at least one of:
a single-mode optical fiber,
a low water peak optical fiber,
a 250 micron diameter optical fiber,
an acrylate-coated optical fiber, and
a dual-acrylate optical fiber.

12. An apparatus, comprising:
a tube having a length between 1 and 100 meters; and
a plastic-coated optical fiber disposed within the tube and having a polymeric buffer conformally disposed on an outer surface thereof;
wherein, when the apparatus is submerged in a fluid, the tube is configured to allow the fluid to contact the polymeric buffer and to equalize an interior pressure of the tube and an exterior pressure of the tube.

13. The apparatus of claim 12, wherein the polymeric buffer is a thermoplastic elastomer or a thermoplastic fluoropolymer.

14. The apparatus of claim 12, wherein the apparatus further comprises a hermetically sealed optical fiber conduit having at least one protected optical fiber disposed therein to transport signals from the polymeric-buffered plastic-coated optical fiber over a distance that exceeds the length of the tube.

15. A subsea cable that comprises:
one or more floodable optical fiber conduits each having at least one tight buffered optical fiber for transporting optical signals, wherein each tight buffered optical fiber has a thermoplastic elastomer or a thermoplastic fluoropolymer as a conformal buffer layer material;
at least one hermetically sealed optical fiber conduit having at least one protected optical fiber spliced to a tight buffered optical fiber from the one or more floodable optical fiber conduits, wherein each of multiple tight buffered optical fibers from the one or more floodable optical fiber conduits is spliced to a corresponding protected optical fiber in the at least one hermetically sealed optical fiber conduit;
two cable segments; and
a connector to join an end of one cable segment to an end of the other cable segment, wherein splices between the tight buffered optical fibers and the protected optical fibers are made within the connector, wherein interiors of the one or more floodable optical fiber conduits are in fluid communication with an exterior of the subsea cable via the connector.

16. The subsea cable of claim 15, wherein each tight buffered optical fiber has a length between 5 m and 2 km.

17. The subsea cable of claim 15, further comprising multiple strength members helically wound around or together with the one or more floodable optical fiber conduits.

18. The subsea cable of claim 15, wherein interiors of the one or more floodable optical fiber conduits are in fluid communication with an exterior of the subsea cable via one or more vents in a wall of the floodable optical fiber conduit.

19. The subsea cable of claim 15, further comprising an array of sensors attached along a length of the subsea cable, each sensor in the array coupled to at least one tight buffered optical fiber from a floodable optical fiber conduit and providing fluid communication between an interior of the floodable optical fiber conduit and an exterior of the subsea cable.

* * * * *